[11] 3,628,072

| [72] | Inventor | Brian John Nicholson<br>Milton, England |
| --- | --- | --- |
| [21] | Appl. No. | 47,080 |
| [22] | Filed | June 17, 1970 |
| [45] | Patented | Dec. 14, 1971 |
| [73] | Assignee | Tracked Hovercraft Limited<br>London, England |
| [32] | Priority | June 18, 1969 |
| [33] | | Great Britain |
| [31] | | 30,926/69 |

[54] LINEAR INDUCTION MOTOR
14 Claims, 5 Drawing Figs.

[52] U.S. Cl. .................................................. 310/13,
104/148
[51] Int. Cl. ........................................................ H02k 41/02
[50] Field of Search ........................................... 310/12-14;
318/135; 104/148, 148 LM

[56] References Cited
UNITED STATES PATENTS

| 2,993,130 | 7/1961 | Laithwaite .................... | 310/13 |
| 3,497,730 | 2/1970 | Doolittle ....................... | 310/13 |
| 3,508,088 | 4/1970 | Davey .......................... | 310/13 |

*Primary Examiner*—D. F. Duggan
*Attorney*—Cameron, Kerkam and Sutton

ABSTRACT: In a linear induction motor the primary member comprises longitudinally disposed stacks of transverse laminations formed with a three-phase winding, and the secondary member comprises an electrically conductive reaction member backed by further transverse magnetic laminations. The magnetic material of the primary and secondary members provides in combination low-reluctance paths which are orientated transversely of the motor and in which working flux passes to produce propulsive force by cooperation with currents which it induces in the reaction member. The part of each low-reluctance path provided by the primary member terminates in end faces which are inclined to one another by an angle of substantially less than 180° and usually 90°, and the secondary member likewise terminates magnetically in end faces inclined to one another by this or a similar angle. The invention is of particular application to transportation systems in which gas cushion vehicles operate along a track having an upstanding central projection for providing vehicle guidance surfaces; the secondary member of the induction motor may then conveniently form the top of the projection.

Patented Dec. 14, 1971

LINEAR INDUCTION MOTOR

This invention relates to linear induction motors.

It is known to use a linear induction motor for propelling a vehicle along a prepared track. In such an application the primary member of the motor is usually carried by the vehicle and the secondary member forms part of the track.

One of the problems which arises with such an arrangement is to find a suitable location for the secondary member. This problem is particularly acute where the track is adapted for supporting and guiding air cushion vehicles for operation along it and is generally in the form of an inverted T, having a central upstanding projection for providing vehicle guidance surfaces flanked by two generally horizontal surfaces for providing vehicle support.

The track is preferably symmetrical about its centerline and, if this is to be achieved with the electrically conductive reaction plate for a conventional double-sided linear induction motor, the reaction plate must be mounted to project from the top of the projection and this, because the reaction plate must be accommodated by a vehicle travelling along the track, results in an unacceptable vehicle configuration.

The presence of the central projection likewise causes difficulty if a conventional single-sided linear induction motor is to be used. It is likely that the width of the secondary member required will be greater than the width of the projection required for providing the necessary strength to resist the lateral guidance forces, so that if the secondary member is to be mounted on the top of the projection, the latter must be thickened, with increased cost and weight. Any other position of secondary member will require at least two induction motors if symmetry is to be achieved.

A further difficulty which occurs with the use of linear induction motors for vehicle propulsion along a prepared track lies in the fact that with conventional linear induction motors (in which working flux passes longitudinally of the motor) the depth of magnetic material required increases with the pole pitch, and hence with the synchronous speed at constant supply frequency.

A primary object of the invention is to provide a linear induction motor of which the secondary member can be readily mounted to form the top of the central projection of the track in the form of an inverted T, and which is also such that the depth of magnetic material required is independent of pole pitch so that high synchronous speeds can be satisfactorily achieved at low (e.g., 60 cycles/sec.) supply frequencies.

Accordingly there is provided a polyphase linear induction motor comprising a primary member and a secondary member each having magnetic material arranged in combination to provide low reluctance paths which lie substantially in planes transverse to the motor, the primary member further comprising polyphase winding means formed on said primary member magnetic material and energizable from a polyphase alternating current supply to produce a field of magnetomotive force which travels longitudinally of the motor and which creates working magnetic flux in said low reluctance paths, said secondary member further comprising electrically conductive material disposed in the path of said working flux, whereby currents induced therein by the working flux react with the working flux to produce a longitudinally directed force between the primary and secondary members, in each said low reluctance path said primary member terminating magnetically at two spaced end faces which face inwardly towards one another and which transversely of the motor are inclined to one another by an angle which is substantially less than two right angles said secondary member correspondingly terminating in two end faces which face outwardly away from one another and which transversely of the motor are inclined to one another by the said angle.

Various aspects and features of the invention will become apparent from the following description given, by way of example, and with reference to the accompanying drawings, of three embodiments of the invention. In the drawings.

Figure 1:
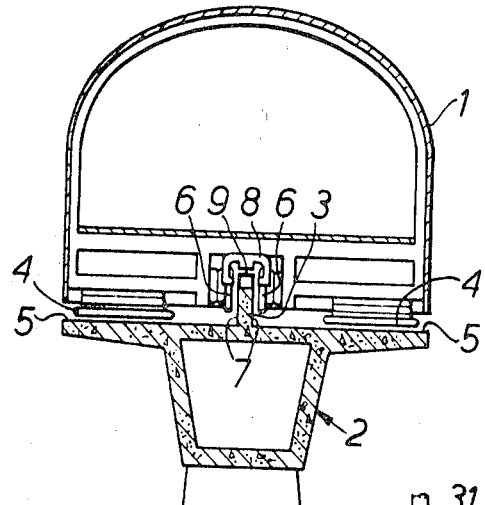
FIG. 1 shows the first embodiment in its application to the propulsion of a gas cushion vehicle along a prepared track having a central projection, the vehicle and track being shown in transverse cross section.
Figure 2:
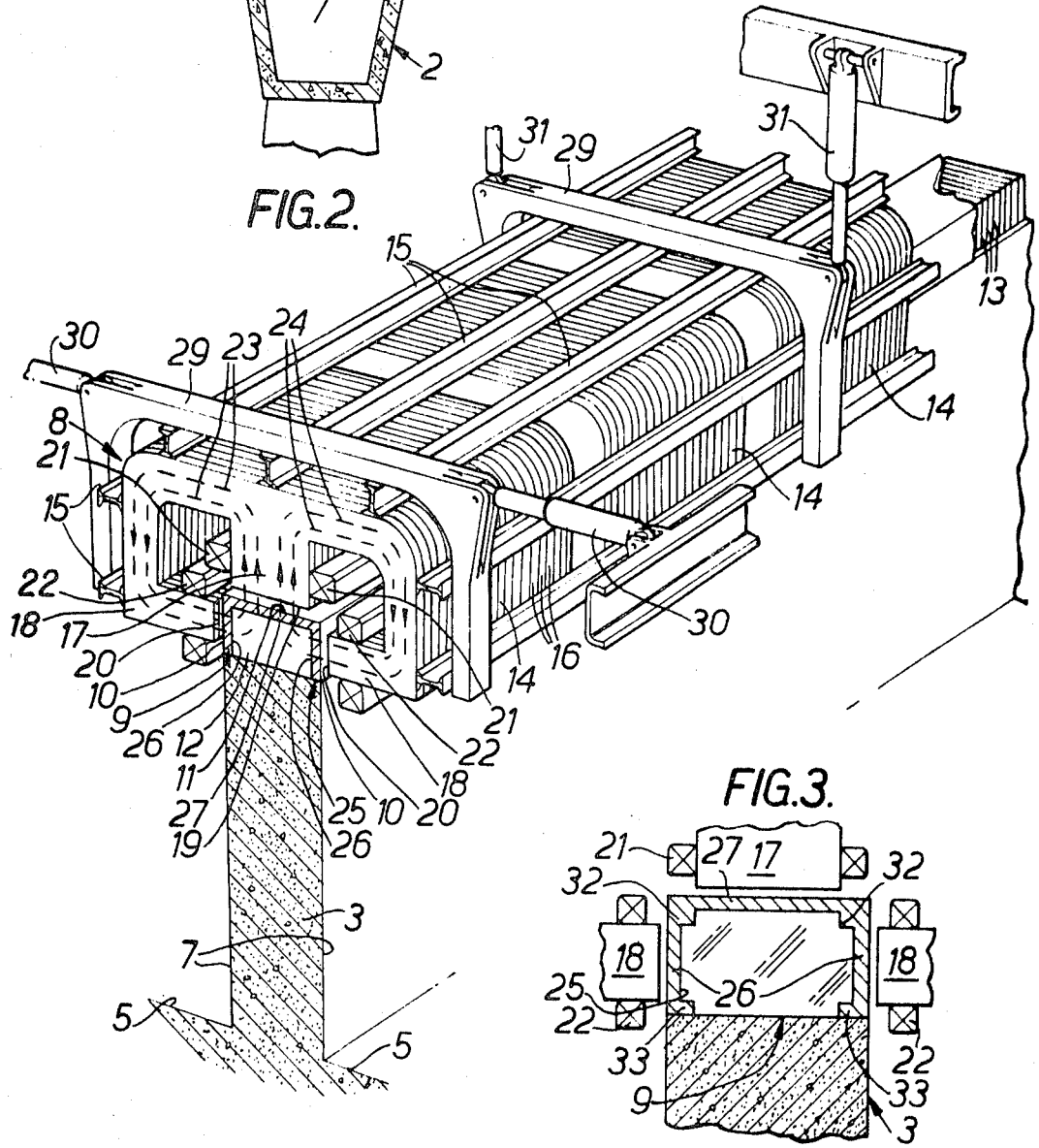
FIG. 2 shows in greater detail and in perspective view the arrangement and mounting of the first embodiment.

Referring now to FIGS. 1 and 2, the first embodiment of the invention is shown in its application to the propulsion of an air cushion vehicle 1 along an elevated and generally concrete track 2. So far as the vehicle support and guidance is concerned, the track is generally in the form of an inverted T in cross section, having two generally horizontal vehicle support surfaces 5 separated by an upstanding and generally vertical projection 3 of which the side surfaces 7 provide the guidance surfaces of the vehicle.

The vehicle body carries resiliently mounted air cushion pads 4 on either side of the projection 3 for supporting the vehicle by cooperation with the support surfaces 5 through cushions of air which the pads 4 form and maintain. Likewise, vehicle guidance is provided by further resiliently mounted air cushion pads 6 cooperating by means of air cushions with the side surfaces 7.

It will be appreciated that for retaining the air cushions beneath them the pads 4 and 6 may be arranged to form air curtains and/or they may be provided with flexible skirts.

Propulsion of the vehicle along the track is provided by a linear induction motor of which the primary member 8 forms part of the vehicle and the secondary member 9 forms part of the track. The arrangement of the secondary member is as follows.

As can be seen in particular in FIG. 2, the secondary member 9 comprises an aluminum or other electrically conductive reaction member 25 in the form of an inverted channel having its sides 26 parallel to one another and perpendicular to its central web part 27. The member 25, which may be formed of a plurality of separate members disposed end-to-end, forms a cap for the projection 3, the outer surface of the web part 27 forming the top surface 11 of the projection and outer surfaces of the sides 26 likewise forming the top part 10 of the side surfaces 7, being flush with the remainder of the surfaces 7 provided by the concrete part of the projection.

Filling the concavity formed beneath the reaction member 25 is a further part 12 of the secondary member comprising rectangular and mutually insulated magnetic laminations 13 which are arranged in planes directed transversely of the track so as to extend continuously along the track.

The primary member 8 for cooperation with the secondary member 9 is arranged as follows. The primary member comprises magnetic material in the form of six longitudinally spaced stacks 14 of transversely oriented and mutually insulated magnetic laminations 16. The lamination stacks 14, of which only three are shown for clarity, are secured together by nonmagnetic members 15 by means of which the primary member is secured to the vehicle body through yokes 29 and hydraulic actuators 30, 31.

The actuators 30, 31 are controlled by means not shown to support and guide the primary member 8 out of contact with the secondary member 9 despite lateral and vertical movements of the vehicle body relative to the track. Drag lines (not shown) are also provided for transmitting propulsive or braking force from then primary member to the vehicle body.

In each lamination stack the laminations 16 are generally E-shaped having a central limb and two outer limbs. The lamination stacks are therefore themselves generally E-shaped in cross section, each having a central limb portion 17 provided by the central limbs of the constituent laminations and having outer limb portions 18 provided by the outer limbs of the laminations. The central limb portions 17 terminate in end faces 19 which in operation oppose in generally parallel relation the top surface 11 of the secondary member.

The outer limb portions 18 of each lamination stack are partly parallel to the central limb portion 17 and partly perpendicular thereto. The parallel parts of the outer limb portions extend downwards beyond the end face 19 of the central limb portion and are there turned inwardly towards one another to form the perpendicular parts. The perpendicular parts terminate in the end faces 20 of the outer limb portions, these end faces opposing respective ones of the sides 26 of the secondary member in generally parallel relationship.

As will be seen from FIG. 2, the end faces 19 and 20 of the lamination stacks are separated from the opposed surfaces of the secondary member by small airgaps.

Each limb portion of each lamination stack is formed with a winding constituted by a simple multiturn coil. For each lamination stack these windings 21 (central limb portion) and 22 (outer limb portions) are connected in series by winding connections (not shown) to form a phase winding.

In operation of the vehicle of FIG. 1, vehicle support and guidance is provided as previously described by means of the air cushion support pads 4 and the air cushion guidance pads 6. The guidance pads 6 are longitudinally displaced from the primary member 8 and so may advantageously be arranged to use the outer surfaces 10 of the reaction member as part of the vehicle guidance surfaces.

Vehicle propulsion is provided by the linear induction motor by energization of the phase windings from a three phase supply. Of the six phase windings the first and fourth taken successively along the motor are energized in opposite senses from one phase of the supply; the second and fifth are energized (in opposite senses) from a second reversed phase of the supply and the third and sixth are energized from the third phase.

In known manner this energization of the windings creates a field of magnetomotive force which travels longitudinally of the motor. It will be understood that the six phase windings of this and the other embodiments of the invention, represent two pole pitches of the field of magnetomotive force, but more or less lamination stacks, and hence phase windings, may be provided if desired to give an appropriately greater or smaller number of poles.

The magnetic material of the primary and secondary members in combination provides a plurality of low reluctance paths linking the primary and secondary members. By reason of the laminated construction each low reluctance path is directed transversely of the motor. Two such low reluctance paths are provided side-by-side across the width of the motor; each low reluctance path of each such pair is provided by, in series, a respective one of the outer limb portions 18, the central limb portions 17 and the magnetic material 12 of the secondary member. It will be appreciated that the magnetic material 12 of the secondary member and, in particular, the central limb portion 17 are common to the two low reluctance paths, and for that reason the width of the central limb portion 17 is made approximately twice the width of each outer limb portion 18.

The travelling field of magnetomotive force generated as previously described drives flux around these low reluctance paths. Each low reluctance path passes twice through the reaction member 25, once at the web part 27 and once at the respective side part 26. Each time flux passes through the reaction member 25 it induces currents to flow in the reaction member in generally rectangular current patterns perpendicular to the flux and aligned longitudinally of the motor. In known manner these currents react with the flux to produce propulsive force by which the vehicle is driven along the track.

It will be appreciated that in each phase winding the windings 22 are connected in a sense to aid the winding 21 to drive flux around each of the associated pairs of side-by-side low reluctance paths. Thus flux flows in the laminations 16 typically as indicated in FIG. 2 by the broken lines 23 and 24.

From FIG. 2 again it will be seen that the web parts 27 and the sides 26 of the reaction member 25 are made wider than the end faces of the primary member which oppose them. In each case the additional width of the reaction member enables current flowing longitudinally of the secondary member in the rectangular current paths previously described to pass in the reaction member in regions which are substantially free of working flux. In this way the interaction between the working flux and the currents induced in the reaction member is substantially restricted to the transversely directed parts of the reaction member current paths, that is to say, the parts of the reaction member current paths which are effective to produce propulsive force.

Figure 3:
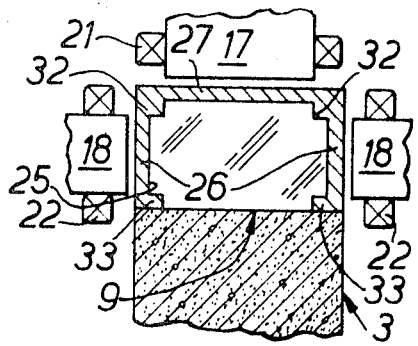
FIG. 3 shows in transverse cross section a part of the first embodiment in a modification thereof.

It is desirable that the additional width of the reaction member provided as described above should have as low a resistance as possible, and FIG. 3 shows one one in which the secondary member 9 may be modified to reduce the resistance of the longitudinally directed parts of the current paths, relatively to that of the transversely directed parts.

Referring now to FIG. 3, it will be seen that the reaction member 25 where it extends laterally beyond the limb portions of the primary member is thickened at 32 and 33. The thickened portions 32 provide low resistance pats for the longitudinally extending parts of the currents associated with the central limb portions 17. In combination with the thickened portions 33 they also provide low resistance paths for the longitudinally extending parts of the currents associated with the outer limb portions 18.

Figure 4:
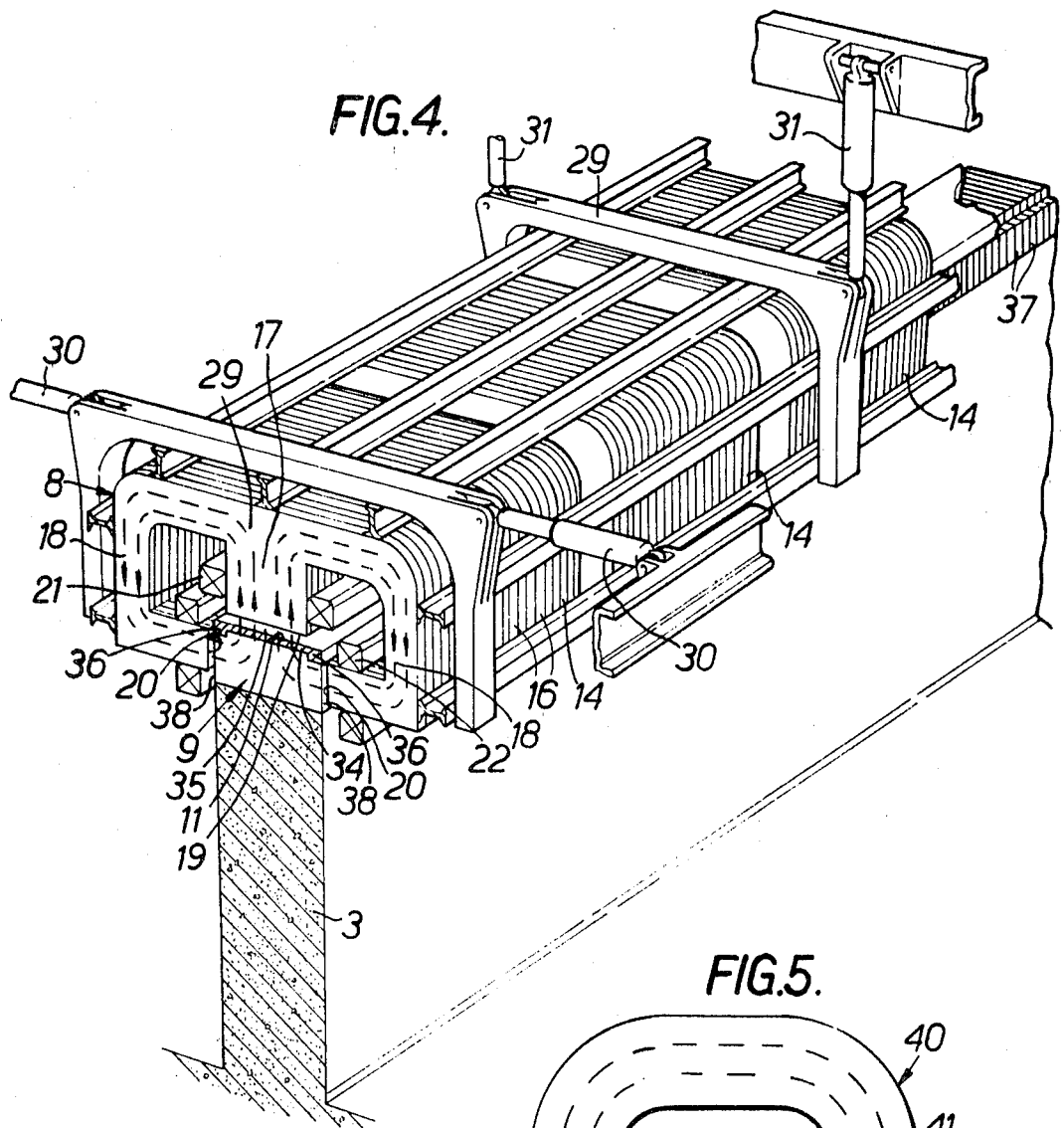
FIG. 4 is a similar view to FIG. 2 of the second embodiment of the invention in the application of FIG. 1.

FIG. 4 shows the second embodiment of the invention to be similar to the first embodiment in many respects and like reference numerals are used to indicate like parts.

The basic difference between the first and second embodiments lies in the arrangement of the secondary member 9. Whereas in the first embodiment, the reaction plate 25 is so arranged that working flux passing in each low reluctance path passes twice through it, in the second embodiment the reaction member 34 is traversed only once by each loop of working flux.

The reaction member 34 of FIG. 4 is generally platelike, having a central web portion 35 between two thickened portions 36. The reaction member is disposed at the very top of the central projection 3 of the track as shown in FIG. 1, and at its plane upper surface 11 forms the top surface of the projection and opposes the end faces 19 of the center limb portions 17.

Between the reaction member 34 and the concrete of the projection 3 is the magnetic material for the secondary member 9. This magnetic material is in the form of generally rectangular and mutually insulated magnetic laminations 37 which are arranged transversely of the track so as to extend continuously along the track beneath the reaction member.

The vertical sides 38 of these laminations form vertical faces which oppose the end faces 20 of the outer limb portions 18.

The thickened portions 36 of the reaction member 34 are disposed laterally of the motor beyond the center limb portions 17 and serve in operation to provide low resistance paths for current passing longitudinally of the motor as previously described in relation to the first embodiment and the first modification thereof.

In a modification of each of the induction motors described hitherto the windings 22 on the outer limb portions 18 are omitted. The additional winding space available then allows the windings 21 to be of greater cross-sectional area.

Figure 5:
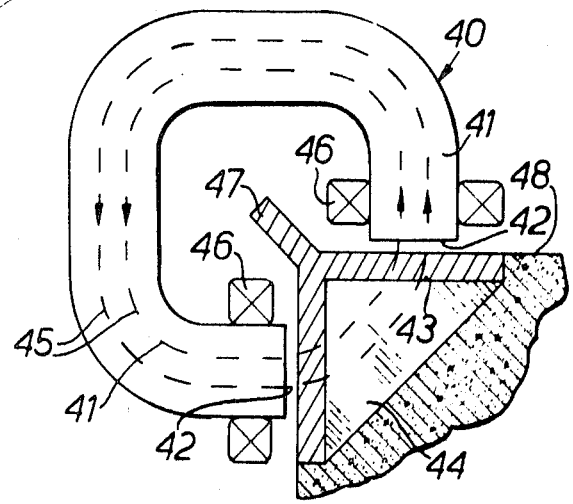
FIG. 5 diagrammatically illustrates in transverse cross section the arrangement of the third embodiment of the invention.

It is not essential for a linear induction motor in accordance with the invention to have two low reluctance paths side-by-side across the width of the motor and FIG. 5 shows a third embodiment of the invention in which only one low reluctance path is provided across the motor width. Referring now to FIG. 5, the primary member of the third embodiment has its magnetic material provided by, for example, six longitudinally spaced stacks 40 of transverse laminations 41. Each lamination stack 41 is generally C-shaped in cross section, terminating magnetically in two end faces 42 which are spaced apart and inclined to one another by one right angle.

Two windings 46 formed of simple multiturn coils are disposed on each lamination stack 41 one adjacent each end face 42. The windings 46 of each stack are connected in an additive sense to form a phase winding.

The secondary member for cooperation with this primary member comprises a reaction member formed by an aluminum angle section 43 which extends along a corner of a prepared track 48 on which operates a gas cushion vehicle supporting, and propelled by, the primary member. The corner of the track at which the reaction member is located may, for example, be one of the four corners of a track of rectangular cross section, or it may be one of the corners of the upstanding projection of an inverted T-shaped track as previously described in relation to the first two embodiments.

The secondary member magnetic material comprises right triangular and transversely oriented magnetic laminations 44 which occupy the concavity formed by the reaction member 43 and which extend continuously along the track with their hypotenuse extending between the edges of the reaction member as shown.

In operation the phase windings of the lamination stacks 40 are energized from the three phases of an alternating current supply taken in rotation as previously described in relation to the first embodiment. Propulsive force is then generated also as previously described, by cooperation of currents in the reaction member with working flux 45 linking the primary and secondary members in transversely oriented plans.

It will be appreciated that working flux in each low reluctance path passes through the reaction member 43 and that, as previously mentioned, only one low reluctance path is provided across the width of the motor.

In order to utilize for propulsion flux which would otherwise pass directly, i.e., as leakage flux, across the airgap between the parts of each stack 41 in the neighborhood of the end faces 42, the reaction member 43 is integrally formed with a fin 47 which extends along the corner of the reaction member so as to project into the concavity formed by each lamination stack 40. Fins similar to the fin 47 can be provided for the secondary members of the embodiments previously described.

Although the described embodiments of the invention have had the parts of the transverse low reluctance paths provided by their primary member magnetic material arranged to terminate magnetically in end faces which are inclined to one another by an angle equal to one right angle, it will be appreciated that such an arrangement is not essential and any relative inclination of the end faces of substantially less then two right angles can be used. As in the described embodiments the secondary member is correspondingly arranged to provide faces, whether of reaction member or magnetic material, which oppose the end faces of the primary member and which are inclined to one another by at least substantially the same angle.

I claim:

1. A polyphase linear induction motor comprising a primary member and a secondary member each having magnetic material arranged in combination to provide low reluctance paths which lie substantially in plane transverse to the motor, the primary member further comprising polyphase winding means formed on said primary member magnetic material and energizable from a polyphase alternating current supply to produce a field of magnetomotive force which travels longitudinally of the motor and which creates working magnetic flux in said low reluctance paths, said secondary member further comprising electrically conductive material disposed in the path of said working flux whereby currents induced therein by the working flux react with the working flux to produce a longitudinally directed force between the primary and secondary member, in each said low reluctance path said primary member terminating magnetically at two spaced end faces which face inwardly towards one another by an angle which is substantially less then the two right angles, said secondary member correspondingly terminating in two end faces which face outwardly away from one another and which transversely of the motor are inclined to one another by said angle, one of the said end faces of the secondary member being provided by the conductive material and the other end face being provided by the secondary member magnetic material.

2. An induction motor according to claim 1 wherein the primary and secondary member magnetic material is arranged in combination to provide the low reluctance paths side-by-side in pairs, the side-by-side low reluctance paths of each pair being provided in part by a common portion of the primary member magnetic material, the polyphase winding means being so arranged that working flux in the low reluctance paths of a pair passes in the same direction in the respective said common portion.

3. An induction motor according to claim 2 wherein the primary member magnetic material comprises a plurality of longitudinally spaced and generally E-shaped stacks of transverse laminations each having three limb portions, the secondary member magnetic material being formed of longitudinally arranged transverse laminations providing first and second longitudinally extending spaced outside-faces of the secondary member, and the conductive material providing a third outside-face of the secondary member between the first and second faces, the ends of the central limb portions opposing the said third face, the conductive material extending transversely of the motor beyond the center limb portions on either side thereof for providing paths of the conductive material current paths which extend longitudinally of the motor and are substantially free of working flux.

4. An induction motor according to claim 3 wherein the parts of the conductive material which extend transversely of the motor beyond the central limb portions of the primary member magnetic material are thicker than the part of the conductive material opposing the central limb portions.

5. An induction motor according to claim 2 wherein the primary member magnetic material comprises a plurality of longitudinally spaced and generally E-shaped stacks of transverse laminations, each lamination stack being formed of three generally parallel limb portions joined by a joke portion and having the ends of the outer limb portions extended beyond the end face of the center limb portions and turned inwardly so as to oppose one another in generally parallel relationship at their end faces, the polyphase winding means being disposed on at least the center ones of he limb portions, the secondary member magnetic material being formed of longitudinally arranged transverse laminations and providing first and second generally parallel and longitudinally extending outside faces of the secondary member and the conductive material providing a third outside face of the secondary member generally orthogonal to, and between the first and second faces, the end of the outer limb portions of the primary magnetic material opposing respective ones of the first and second faces of the secondary member and the central limb portions opposing the third face thereof, the conductive material extending transversely of the motor beyond the central limb portions on either side thereof for providing parts of the conductive material current parts which extend longitudinally of the motor and which are substantially free of working flux.

6. An induction motor according to claim 5, wherein the polyphase winding means is disposed on all three limb portions of the lamination stacks of the primary member magnetic material.

7. A polyphase linear induction motor comprising a primary member and a secondary member each having magnetic material arranged in combination to provide low reluctance paths which lie substantially in planes transverse to the motor, the primary member further comprising polyphase winding means formed on said primary member magnetic material and energizable form a polyphase alternating current supply to produce a field of magnetomotive force which travels longitudinally of the motor and which creates working magnetic flux in said low reluctance paths, said secondary member further comprising electrically conductive material disposed in the path of said working flux whereby currents inducted therein by the working flux react with the working flux to produce a longitudinally directed force between the primary and secondary members, in each said low reluctance paths said primary member terminating magnetically at two spaced end faces which face inwardly towards one another and which transversely of the motor are inclined to one another by an angle which is substantially less then two right angles, said secondary member correspondingly terminating in two end faces which face outwardly away from one another and which transversely of the motor are inclined to one another by said angle, both of the said end faces of the being provided by the conductive material.

8. An induction motor according to claim 7, wherein the conductive material extends continuously between the two said end faces and is formed at the intersection therebetween with a projection disposed in the path of the flux which would otherwise pass directly between spaced parts of the primary member magnetic material.

9. An induction motor according to claim 7, wherein the primary and secondary member magnetic material is arranged in combination to provide the low reluctance paths side-by-side in pairs, the side-by-side low reluctance paths of each pair being provided in part by a common portion of the primary member magnetic material, the polyphase winding means being so arranged that working flux in the low reluctance paths of a pair passes in the same direction in the respective said common portion.

10. An induction motor according to claim 9, wherein the primary member magnetic material comprises the plurality of longitudinally spaced and generally E-shaped stacks of transverse laminations each having three limb portions, the conductive material being of generally channel-shaped cross section and the secondary member magnetic material being formed of longitudinally arranged transverse laminations received in the concavity defined by the conductive material, the conductive material providing at its outside faces of the secondary member and also providing a third outside face of the secondary member between the first and second faces thereof the secondary member being disposed with its said first and second faces opposing the end faces of respective ones of the outer limb portions of the primary magnetic material and with its said third face opposing the end faces of the central limb portions.

11. An induction motor according to claim 10, wherein the conductive material extends transversely of the motor beyond each limb portion of the primary magnetic material for providing parts of the conductive material current paths which extend longitudinally of the motor and are substantially free of working flux.

12. An induction motor according to claim 11, wherein said parts of the conductive material which extend transversely of the motor beyond each limb portion are thicker than the parts of the conductive material of the limb portions.

13. An induction motor according to claim 9, wherein the primary member magnetic material comprises a plurality of longitudinally spaced and generally C-shaped stacks of transverse laminations terminating magnetically in two end faces which face inwardly towards one another and which transversely of the motor are inclined to one another by one right angle, the conductive material being of generally L-shaped cross section and the secondary member magnetic material being formed of longitudinally arranged transverse laminations occupying the concavity defined by the conductive material, the conductive material providing at its outside first and second longitudinally extending and orthogonal outside faces of the secondary member which respectively oppose the two end faces of the said lamination stacks of the primary member magnetic material.

14. An induction motor according to claim 13, wherein the laminations of the secondary member magnetic material are generally right triangular, having their hypotenuse extending between the edges of the conductive material.

* * * * *

UNITED STATES PATENT OFFICE
CERTIFICATE OF CORRECTION

Patent No. 3,628,072          Dated December 14, 1971

Inventor(s) Brian John Nicholson

It is certified that error appears in the above-identified patent and that said Letters Patent are hereby corrected as shown below:

Column 2, line 68, "then" should read --the--. Column 4, line 16, "one", second occurrence, should read --way--; line 23, "pats" should read --paths--. Column 5, line 71, "then" should read --than--. Column 6, line 22, after "the", second occurrence, insert --outer limb portions of the primary member magnetic material opposing respective ones of the first and second faces and the ends of the--; line 37, "joke" should read --yoke--; line 42, "he" should read --the--; line 68, "form" should read --from--; line 73, "inducted" should read --induced--. Column 7, line 7, "then" should read --than--; line 11, after "the", second occurrence, insert --secondary member--; line 36, after "outside" insert --first and second longitudinally extending spaced outside--.

Signed and sealed this 6th day of June 1972.

(SEAL)
Attest:

EDWARD M. FLETCHER, JR.
Attesting Officer

ROBERT GOTTSCHALK
Commissioner of Patents